(12) United States Patent
Bui

(10) Patent No.: US 9,614,419 B2
(45) Date of Patent: Apr. 4, 2017

(54) ACTUATOR

(71) Applicant: Johnson Electric S.A., Murten (CH)

(72) Inventor: Tanh Minh Bui, Hendersonville, TN (US)

(73) Assignee: JOHNSON ELECTRIC S.A., Murten (CH)

( * ) Notice: Subject to any disclaimer, the term of this patent is extended or adjusted under 35 U.S.C. 154(b) by 356 days.

(21) Appl. No.: 14/297,080

(22) Filed: Jun. 5, 2014

(65) Prior Publication Data

US 2014/0361667 A1 Dec. 11, 2014

Related U.S. Application Data

(60) Provisional application No. 61/832,334, filed on Jun. 7, 2013.

(51) Int. Cl.
| | | |
|---|---|---|
| H02K 11/00 | (2016.01) | |
| H02K 7/116 | (2006.01) | |
| H02K 23/66 | (2006.01) | |
| H02K 11/21 | (2016.01) | |
| H02P 7/03 | (2016.01) | |
| H02K 5/08 | (2006.01) | |

(52) U.S. Cl.
CPC ......... *H02K 11/0015* (2013.01); *H02K 7/116* (2013.01); *H02K 7/1166* (2013.01); *H02K 11/21* (2016.01); *H02K 23/66* (2013.01); *H02P 7/03* (2016.02); *H02K 5/08* (2013.01)

(58) Field of Classification Search
CPC ...... H02K 11/21; H02K 7/1166; H02K 23/66; H02P 7/03

USPC ........ 318/295, 666; 236/78 C; 310/68 B, 83, 310/177

See application file for complete search history.

(56) References Cited

U.S. PATENT DOCUMENTS

| | | | | | |
|---|---|---|---|---|---|
| 3,683,308 | A | * | 8/1972 | Hamill ..................... | H01C 1/12 338/162 |
| 3,742,317 | A | * | 6/1973 | Shao ................. | H01L 21/30608 148/DIG. 115 |
| 4,506,203 | A | * | 3/1985 | Redmond, Jr. .......... | G05D 3/16 318/624 |
| 4,616,164 | A | * | 10/1986 | Kenny ................... | H01C 10/14 318/15 |
| 5,990,586 | A | * | 11/1999 | Milano, Jr. ............ | H02K 11/21 310/75 R |

(Continued)

OTHER PUBLICATIONS

Vishay, "Diodes-Small-Signal Switching Diodes-SOT-23 Package", From vishay.com, Oct. 2013.*

*Primary Examiner* — Quyen Leung
*Assistant Examiner* — Eric Johnson
(74) *Attorney, Agent, or Firm* — Muncy, Geissler, Olds & Lowe, P.C.

(57) ABSTRACT

An actuator includes a DC motor having two terminals to be fed with DC power, an output gear driven by the DC motor, a potentiometer having an arc resistive element with two ends and an electrically conductive wiper that moves along the resistive element, and two diodes. The wiper rotates with the output gear to provide a signal indicative of the rotational position of the output gear. The anodes of the two diodes are both electrically connected to one end of the resistive element, and the cathodes of the two diodes are electrically connected to the two terminals of the motor respectively.

5 Claims, 6 Drawing Sheets

(56) References Cited

U.S. PATENT DOCUMENTS 6,545,441 B1 * 4/2003 Grady ................... G05B 19/33
                                                           318/560
7,070,117 B2 * 7/2006 Kook ................. B60H 1/00857
                                                           236/1 C

* cited by examiner

ACTUATOR

CROSS REFERENCE TO RELATED APPLICATIONS

This non-provisional patent application claims priority under 35 U.S.C. §119(e) from Provisional Patent Application No. 61/832,334 filed in USA on Jun. 7, 2013.

FIELD OF THE INVENTION

This invention relates to an actuator having a feed back signal and in particular, to an actuator having a feed back circuit with a reduced number of terminals.

BACKGROUND OF THE INVENTION

Actuators, such as those used in heating, ventilation and air conditioning (HVAC) systems, typically comprise a direct current (DC) motor, an output gear driven by the motor, a potentiometer for monitoring the position of the gear, and a socket having five terminals, two motor terminals for the motor and three terminals for the potentiometer. The potentiometer has a resistive track having first and second ends and a wiper which is arranged to make sliding contact with the resistive track to provide a signal indicative of the rotational position of the output gear. The first and second ends are connected to first and second terminals of the socket and the wiper is connected to a third terminal of the socket known as the position terminal. The motor is provided with a first DC power source, such as 12 volts, via the two motor terminals of the socket. The two terminals connected to the resistive track of the potentiometer are connected to a second DC power source, such as 5 volts. The position terminal thus provides a feed back signal corresponding to the position of the output gear. The polarity of the two motor terminals has to be switched to change the rotational direction of the motor. This means we can not eliminate a terminal of the socket by directly connecting the ground terminal of the potentiometer to the ground terminal of the motor, as the motor has no consistent ground terminal.

The present invention aims to provide a new actuator which can solve or at least mitigate the above mentioned problem.

SUMMARY OF THE INVENTION

Accordingly, in one aspect thereof, the present invention provides an actuator comprising: a DC motor having two motor terminals to be fed with DC power; an output gear driven by the DC motor; a potentiometer comprising an arc resistive element having first and second ends and a electrically conductive wiper configured to move along the resistive element as the output gear rotates; and two diodes; wherein the anodes of the two diodes are both electrically connected to the first end of the resistive element and the cathodes of the two diodes are electrically connected to the two motor terminals respectively.

Preferably, at least one of the two diodes is a Schottky diode.

Preferably, the two diodes are provided in a single package having three terminals, with the anodes of the diodes being connected together inside the package.

Preferably, a gear train connects the output gear to the DC motor, and the gear train comprises a first gear that is coaxially and integrally formed with the output gear and the wiper is fixed to the first gear.

Preferably, the potentiometer further comprises a circuit board having a hole through which the output gear runs, an arc shaped conductive trace surrounding the hole, and the resistive element surrounds the conductive trace; the wiper comprises a fixed end that is fixed to the first gear, and a first flexible piece and a second flexible piece that extend from radially inner and outer sides of the fixed end respectively, the first and second flexible pieces make continuous sliding contact with the conductive trace and the resistive element respectively during rotation of the output gear.

In embodiments of the present invention, the potentiometer ground path is connected to the ground path of the motor via the two diodes. This enables elimination of one of the terminals of the connection socket used to connect the actuator to a control circuit and power source while performing the same function as a traditional actuator.

BRIEF DESCRIPTION OF THE DRAWINGS

An embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
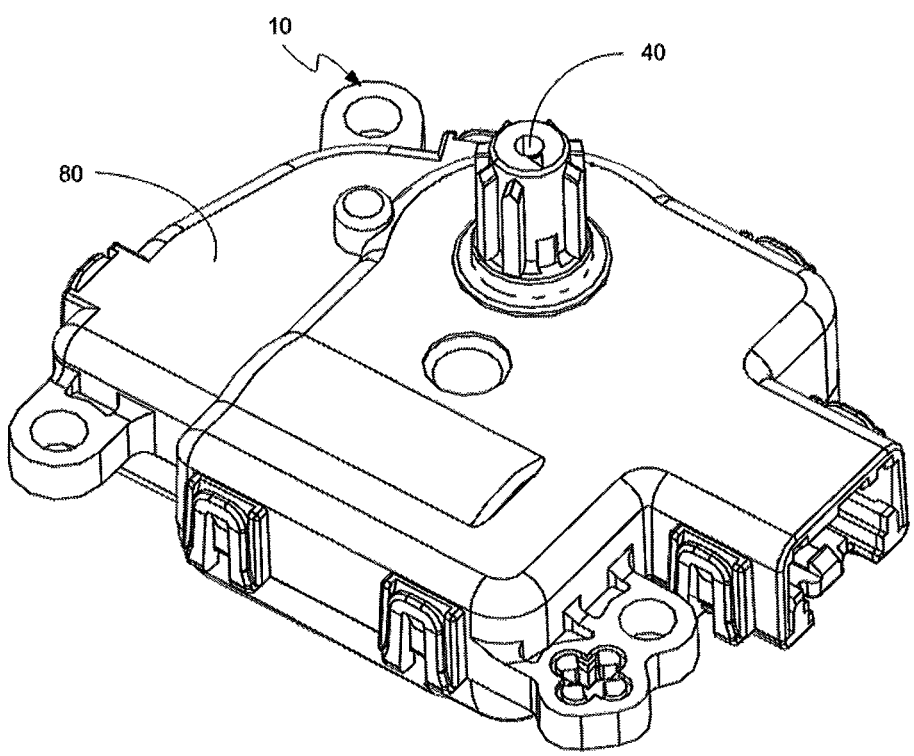
FIG. 1 shows an actuator according to the preferred embodiment of the present invention.

As shown in the drawings, an actuator 10, according to the preferred embodiment of the present invention, includes a DC motor 20, a gear train 30, an output gear 40, a potentiometer 50, a first diode 60, a second diode 70, and a casing 80.

The motor 20 has two motor terminals 21 and 22 and a motor shaft 24. The motor terminals, in use, are fed with DC power. The motor 20 may be a permanent magnetic brush motor and the motor terminals 21 and 22 are electrically connected to the brushes. Alternatively, the motor may be a brushless DC motor. The output gear 40 is connected to the motor 20 via the gear train 30 to generate an output with a reduced rotational speed but higher torque. The gear train 30 is designed to rotate the output gear 40 through less than 360 degrees. In the present embodiment, the gear train 30 includes a worm fixed to the motor shaft 24, a first gear 32 in mesh with the worm, a second gear 34 connected to the first gear 32, and a third gear 36 connected to the second gear 34. The output gear 40 is coaxially and preferably integrally formed with the third gear 36 so as to rotate with it.

Figure 3:
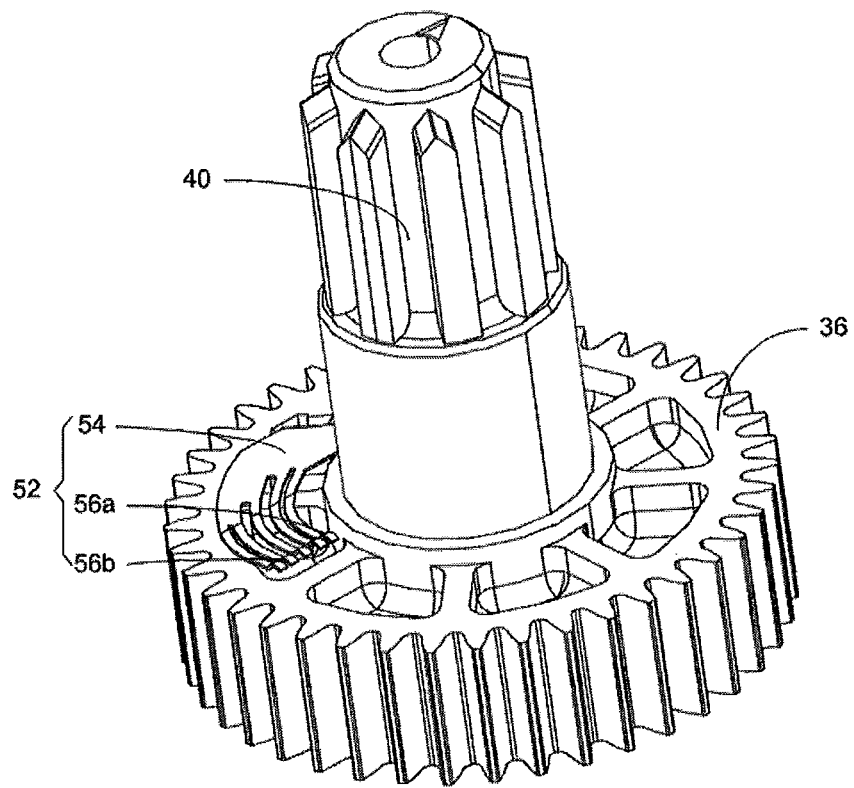
FIG. 3 shows a third gear, an output gear, and a wiper of a potentiometer, being parts of the actuator.
Figure 4:
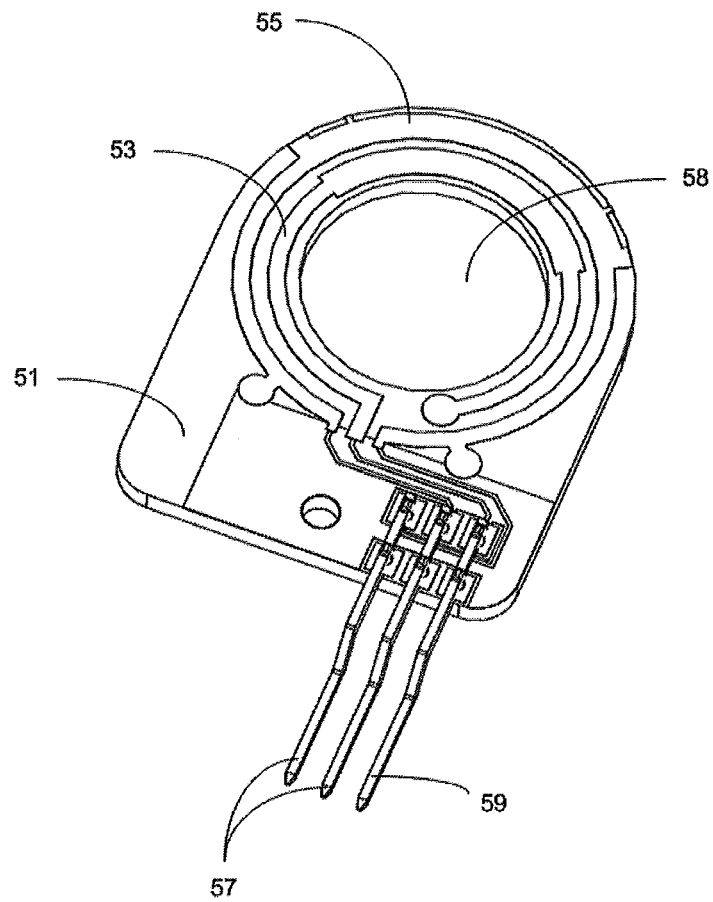
FIG. 4 shows a circuit board of the potentiometer.

As shown in FIGS. 3 and 4, the potentiometer 50 includes a circuit board 51 and an electrically conductive wiper 52. The circuit board 51 has a first trace 53 shaped as an arc of a circle, a second trace 55 also shaped as an arc of a circle and surrounding the first trace 53, two end terminals 57, and a position terminal 59. The first trace 32 may be made of copper and is electrically connected to the position terminal 59. The second trace 55 is made of a material having a uniform resistance so that it can be treated as a resistor. Two ends of the second trace 55 are respectively connected to the two end terminals 57.

The wiper 52 may be made of copper. It has a fixed end 54 assembled to an axial end surface of the third gear 36, at least one first flexible piece 56a extending from the radially inner side of the fixed end 54, and at least one second flexible piece 56b extending from the radially outer side of the fixed end 54. The first and second flexible pieces 56a, 56b both tilt away from the third gear 36. The first flexible piece 56a is spaced from the second flexible piece 56b and is electrically connected to the second flexible piece 56b via the fixed end 54. The first flexible piece 56a is arranged to make sliding electrical contact with the first trace 53 and the second flexible piece 56b is arranged to make sliding electrical contact with the second trace 55.

Figure 2:
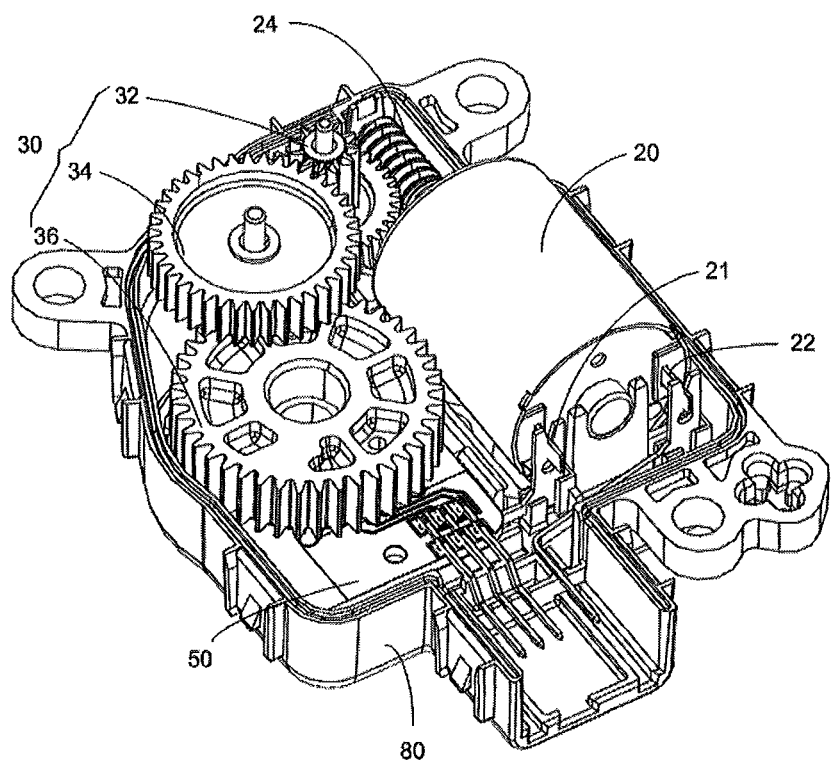
FIG. 2 shows the actuator of FIG. 1, with a cover removed.

The circuit board 51 of the potentiometer 50 is fixed to the casing 80 and is positioned between the third gear 36 and the casing 80, as shown in FIG. 2. The output gear 40 is inserted through a through hole 58 that is formed in the circuit board 51 and the traces 53, 55 extend around the hole. The first and second flexible pieces 56a, 56b respectively press against the first and second traces 53, 56. As such, the first flexible piece 56a makes continuous, sliding contact with the first trace 53. The second flexible piece 56b makes continuous sliding contact with the second trace 55 during rotation of the output gear 40.

Figure 5:
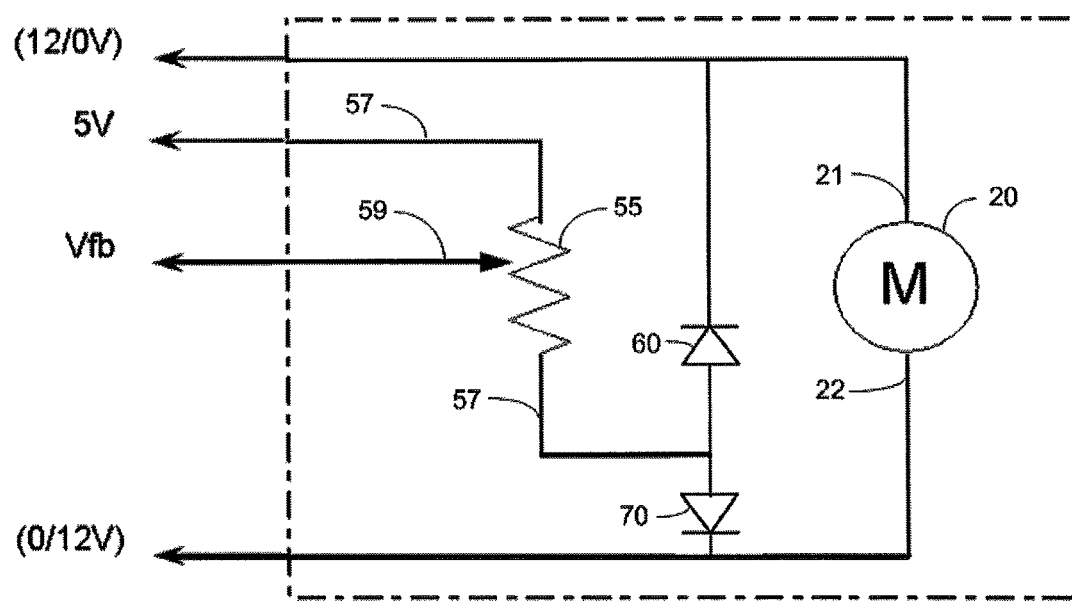
FIG. 5 is a schematic diagram showing the electrical circuit of the actuator.

As shown in the schematic wiring diagram of FIG. 5, the anodes of the first and second diodes 60, 70 are connected together, while the cathodes are respectively connected to the motor terminals 21, 22. A first end terminal 57 of the potentiometer 50 is arranged to be connected to a voltage source, while the second end terminal 57 is connected to the anodes of the first and second diodes 60, 70. The position terminal 59 provides the output feedback signal.

In operation, the motor terminals 21, 22 are respectively connected to ground and a first voltage source, e.g. 12V. The first end terminal 57 of the potentiometer 50 is connected to a second voltage source, e.g. 5V. The position terminal 59 is connected to a control circuit (not shown) that controls the motor 20. In this case, as the voltage drop between the anode and the cathode of the first diode 60 is greater than 0.7V, the first diode 60 is turned on and the second diode 70 is turned off. Thus, the second end terminal 57 of the potentiometer 50 is connected to ground via the first diode 60.

As the output gear 40 rotates, the wiper 50 rotates with it, causing the second flexible piece 56b to slide along the second trace, contacting different points of the second trace 55 thus varying the resistance between the end terminals and the position terminal. According to the voltage ratio principle, voltage at any point along the second trace 55 is directly proportional to the relative position of this point with respect to the full length of the second trace 55. Thus, the voltage at the position terminal 59 reflects the angular position of the output gear 24 and provides the feedback signal.

When the polarity of the terminals 21 and 22 are reversed to change the rotational direction of the motor 20, the first diode 60 is turned off and the second diode 70 is turned on, as the voltage drop across the second diode is greater than 0.7 v and the voltage drop across the first diode is negative. Thus the second end terminal 57 of the potentiometer 50 is now connected to ground via the second diode 70.

In the present invention, the potentiometer ground path is connected to the ground path of the motor 20 via the two diodes 60 and 70. This enables the elimination of one connecting terminal of the connection socket used to connect the actuator 10 to a control circuit and power source while providing a full position feedback signal.

Figure 6:
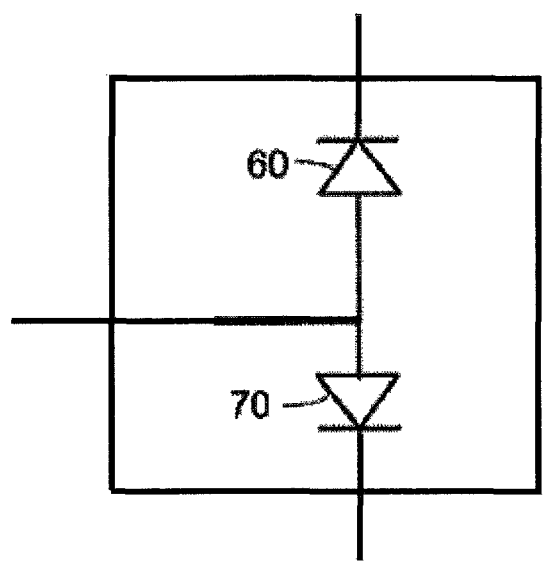
FIG. 6 is a schematic diagram showing the diodes in a package.

Preferably, at least one of the two diodes 60, 70 is a Schottky diode for minimizing voltage drop. More preferably, the two diodes 60, 70 are provided in a single package having three terminals, as shown in FIG. 6, with the anodes of the diodes connected together within the package, so as to simplify manufacturing.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. An actuator, comprising:
a DC motor having two motor terminals to be fed with DC power;
an output gear driven by the DC motor;
a potentiometer comprising an arc resistive element having first and second ends and an electrically conductive wiper configured to move along the resistive element as the output gear rotates; and
two diodes,
wherein the anodes of the two diodes are both electrically connected to the first end of the resistive element and the cathodes of the two diodes are electrically connected to the two motor terminals respectively, wherein the first end of the resistive element is grounded via one of the diodes.

2. The actuator of claim 1, wherein at least one of the two diodes is a Schottky diode.

3. The actuator of claim 1, wherein the two diodes are provided in a single package having three terminals, with the anodes of the diodes being connected together inside the package.

4. The actuator of claim 1 further comprising a gear train connecting the output gear to the DC motor, wherein the gear train comprises a first gear that is coaxially and integrally formed with the output gear, and the wiper is fixed to the first gear.

5. The actuator of claim 4, wherein the potentiometer further comprises a circuit board having a hole through which the output gear runs, an arc shaped conductive trace surrounding the hole, and the resistive element surrounds the conductive trace; the wiper comprises a fixed end that is fixed to the first gear, and a first flexible piece and a second flexible piece that extend from radially inner and outer sides of the fixed end respectively, the first and second flexible pieces make continuous sliding contact with the conductive trace and the resistive element respectively during rotation of the output gear.

* * * * *